(12) United States Patent
Tertitski et al.

(10) Patent No.: US 6,493,681 B1
(45) Date of Patent: Dec. 10, 2002

(54) METHOD AND SYSTEM FOR VISUAL ANALYSIS OF INVESTMENT STRATEGIES

(75) Inventors: Leonid Mark Tertitski, San Jose, CA (US); Alexey George Goder, Sunnyvale, CA (US)

(73) Assignee: ProxyTrader, Inc., Sunnyvale, CA (US)

( * ) Notice: Subject to any disclaimer, the term of this patent is extended or adjusted under 35 U.S.C. 154(b) by 0 days.

(21) Appl. No.: 09/372,507

(22) Filed: Aug. 11, 1999

(51) Int. Cl.$^7$ .................................. G06K 17/60
(52) U.S. Cl. ..................... 705/36; 705/37; 705/36
(58) Field of Search ................................. 705/36

(56) References Cited

U.S. PATENT DOCUMENTS

| | | | | |
|---|---|---|---|---|
| 5,978,778 A | * | 11/1999 | O'Shaughnessy | 705/36 |
| 6,012,042 A | * | 1/2000 | Black | 705/36 |
| 6,175,824 B1 | * | 1/2000 | Breitzman | 705/36 |
| 6,219,650 B1 | * | 4/2000 | Friend | 705/36 |
| 6,061,663 A | * | 5/2000 | Bloom | 705/36 |
| 6,064,985 A | * | 5/2000 | Anderson | 705/36 |
| 6,289,321 B1 | * | 9/2001 | Suganuma | 705/36 |

FOREIGN PATENT DOCUMENTS

EP 1114381 A1 * 7/2001 .......... G06R/17/60

WO WO0016226 * 3/2000

OTHER PUBLICATIONS

Applying Theory to Loan Portfolio Management Stern, Leonard; Purchia Michael Financial Manager's Statement v14n1 pp. 17–19, Jan. 1992.*

* cited by examiner

Primary Examiner—Vincent Millin
Assistant Examiner—Geoffrey Akers
(74) Attorney, Agent, or Firm—Hickman Palermo Truong & Becker LLP; Christopher J. Palermo

(57) ABSTRACT

The present invention relates to a system and method for generation of strategies of investment in publicly traded stocks and a method of choosing the strategy with capital gain greater than traditional buy and hold strategy. The system and method is capable of generating thousands of investment strategies finding the best strategy delivering the optimal capital gain. The visualization method gives investor ability to analysis dynamics and stability of chosen strategy versus time with the speed of animation. Using Ad the system on a PC with 200–300 MZ CPU the user can analyze 20–40 different views for 5–10 seconds, which otherwise with the traditional technique takes more then 10,000 plots.

23 Claims, 5 Drawing Sheets

Recommendation For The Current Trading Day

*Strategy Matrix*

*Flow Chart For Calculation Of The Strategy Matrix (Continued)*

Flow Chart For Calculation Of The Strategy Matrix

Visualizing The Strategy Matrix

Recommendation For The Current Trading Day

METHOD AND SYSTEM FOR VISUAL ANALYSIS OF INVESTMENT STRATEGIES

CROSS-REFERENCE TO RELATED APPLICATIONS

Not applicable.

STATEMENT REGARDING FEDERALLY SPONCORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a system and method for generation of strategies of investment in publicly traded stocks and a method of choosing the strategy with capital gain greater than traditional buy and hold strategy. In particular, the invention combines a generation of strategies for day stock trading, method for calculation of capital gain for each strategy based on the historical stock quotes, method for automatic selection of the best strategy, method of fast visual dynamics and stability evaluation of such strategies versus time, and method for selecting stocks for investment potentially giving best capital gains.

2. Description of the Prior Art

Various business activities have needs to estimate and plan their business strategies and decisions especially in the area of investments. Investing in publicly traded stocks involves analysis of numerous strategies: what particular stock and when to buy or sell. The ability to perform accurate analysis or predict and choose the optimal strategy plays an important role in the future success. Most of investment decisions are based on the present and past historical data analysis. The typical approach is visualization of data in form of a graph of a parameter versus time, for example price per share for a certain stock versus time. The analysis is performed by calculating the trend of the data and extending the trend into the future, making buy, sell or hold decisions. The predicted trend depends on the multiple assumptions, parameters and conditions. Consideration of multiple combinations of the assumptions and parameter values leads to the comparison of hundreds and thousands graphs. It is difficult and time consuming for an investor or investment analyst to visually evaluate that many combinations of parameters for multiple stocks. As a result the investor or investment analyst is capable of performing only a partial analysis of a subset of the investment strategies and therefore the optimal investment strategy may be missed.

BRIEF SUMMARY OF THE INVENTION

The present invention relates to a computer-based system and method for generation of strategies of investment in publicly traded stocks and a method of choosing the strategy with capital gain greater than traditional buy and hold strategy. The system calculates capital gains for different strategies in form of a strategy matrix using the historical stock data over a period of analysis. The strategy matrix size is typically 100 by 100 covering 10,000 investment strategies. The horizontal axis is responsible for raising stock price, the vertical one for declining stock price. Each axis is subdivided by 100 level. Each level represents a recommended sell price relatively to the opening stock price on the current trading day. The system calculates total capital gain for each of 10,000 permutations of strategies based on the historical data within the period of analysis.

The system calculates stock day sell limit orders for each strategy and for each trading day just after the stock market is open. The calculation is performed based on a formula— G, FIG. 2, for sell limit or sell stop limit orders. Each order depends on the opening price of the stock versus the closing price on the previous trading day. If the stock gets sold during the trading day, the system automatically creates a recommendation to buy the stock back at the closing of the stock market. Then the system accumulates capital gains or losses for each strategy on a certain viewing date set by the user. The accumulated capital gain or loss is an element of the strategy matrix. Then the system performs the visualization of the strategy matrix by assigning a specific color and brightness to each matrix element. Then the matrix is displayed on the screen of the computer. Areas of the same color of the strategy matrix represent the same level of success for a number of strategies. The brightest pixel or pixels represent the best winning strategy or strategies delivering the maximum capital gain. The best strategy can be easily identified by the user by just looking at the displayed strategy matrix on a computer screen. It is also automatically calculated by the system and displayed in a special field on the computer screen.

The best strategy can be validated using the historical stock data by placing the viewing date in the past. The user can quickly and easily go from one viewing date to another one by scrolling the control bar. The system then recalculates and redisplays the strategy matrix on a new viewing date. The displayed strategy matrix changes with the speed of animation. The brightest spot on the strategy matrix may or may not change the its shape and position versus the viewing date. It gives an ability to quickly analyze the dynamic and stability of the best strategy. The stable position of the brightest spot on the strategy matrix means that the best strategy is stable versus time while changing shape or position of the brightest spot means that the best strategy is changing versus time. Of course, different stock may have different best strategies. Using the system on a PC with 200–300 MZ CPU the user can analyze 20–40 different views for 5–10 seconds, which otherwise with the traditional technique takes more then 10,000 plots, 20 samples each.

BRIEF DESCRIPTION OF DRAWINGS

1. Strategy Matrix.

2. Calculating Matrix of Strategies.

3. Calculating Matrix of Strategies (Continued).

4. Visualizing Matrix of Strategies.

5. Recommendation for the current trading day.

DESCRIPTION OF INVENTION

Figure 1:
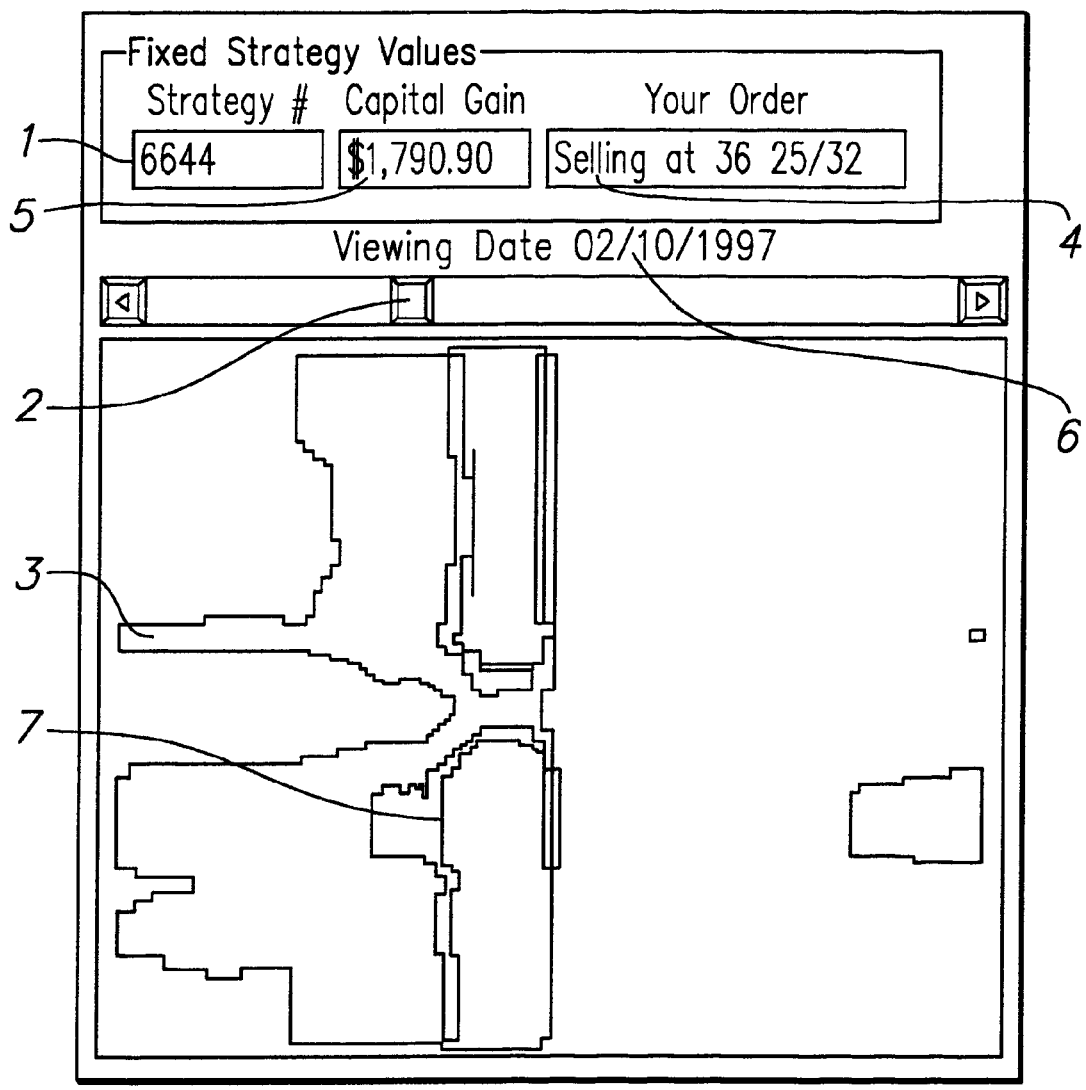
FIG. 1 shows a black-and-white example of a color strategy matrix including strategy number 1, capital gain 5, recommended order 4, viewing day 6, a sliding bar for date input 2, a rectangular area displaying 10,000 strategies 3 and the brightest spot representing the best strategy 7.

The system consists of a personal computer, monitor, keyboard and mouse. The computer is connected to the Internet. The operating system is Microsoft Windows 95 or later versions. At least 32 megabytes of RAM and 5 megabytes of disk space are required. The monitor should be at least VGA with resolution 640×480 or more, and 256 or more colors per pixel are required. There are no special requirements for the keyboard, mouse, and Internet connection.

The software module is supplied as a self-extractable executable file. The user needs to start the module and follow the installation wizard steps. The system calculates capital gains for different strategies in form of a strategy matrix 3 using the historical stock data over a period of analysis. The historical stock data is obtained from third party stock information vendors/transmitters. The strategy matrix size is typically 100 by 100 covering 10,000 investment strategies. The horizontal axis is responsible for raising stock price, the vertical one for declining stock price. Each axis is subdivided by 100 level. Each level represents a recommended sell price relatively to the opening stock price on the current trading day. If the recommended sell price is below the opening price then the recommendation is to place a day sell stop limit order at this price. If the recommended sell price is above the opening price then the recommendation is to place a day sell limit order at this price. Each element of strategy matrix has a number 1 representing a certain level of the selling price if the stock price declines and another level of the selling price if it raises. The strategy matrix combines all permutations of horizontal and vertical sell price levels.

The system calculates total capital gain 5 for each of 10,000 permutations of strategies based on the historical data within the period of analysis. Then the system performs the visualization of the strategy matrix by assigning a specific color and brightness to each matrix element. Then the matrix is displayed on the screen of the computer. Areas of the same color of the strategy matrix 3 represent the same level of accumulated capital gain 5 on the viewing date 6 for a number of strategies. The best strategy 7 delivering the highest accumulated capital gain over the period of analysis is represented by the brightest spot on the strategy matrix 3.

The system performs number crunching and generate a recommendation in form of a stock day sell limit order 4 for each strategy and for each trading day just after the stock market is open. The user can evaluate the performance of the best strategy and also all strategies versus time by inputting the viewing date 6 using sliding bar 2. The visualized strategy matrix 3 makes clear for the user the dynamic of all 10,000 strategies and the best choice.

The method then is applied to various stocks. The system calculates the comparison of the best strategy versus the traditional buy and hold strategy. Each individual stock is performed differently over the period of analysis.

OPERATION OF INVENTION

The user starts the program and enters the following values: date of the initial investment, the amount of the initial investment, the broker commission per transaction, and stock ticker symbol. Then the user presses the 'OK' button. The system checks if the historical prices have already been down loaded into the computer hard drive. If data is absent or not up today, the system asks user's permission to download the missing portion of the data—Block B on FIG. 2. After data is loaded the system starts the calculation of strategy matrix—Block A on FIG. 2.

Figure 2:
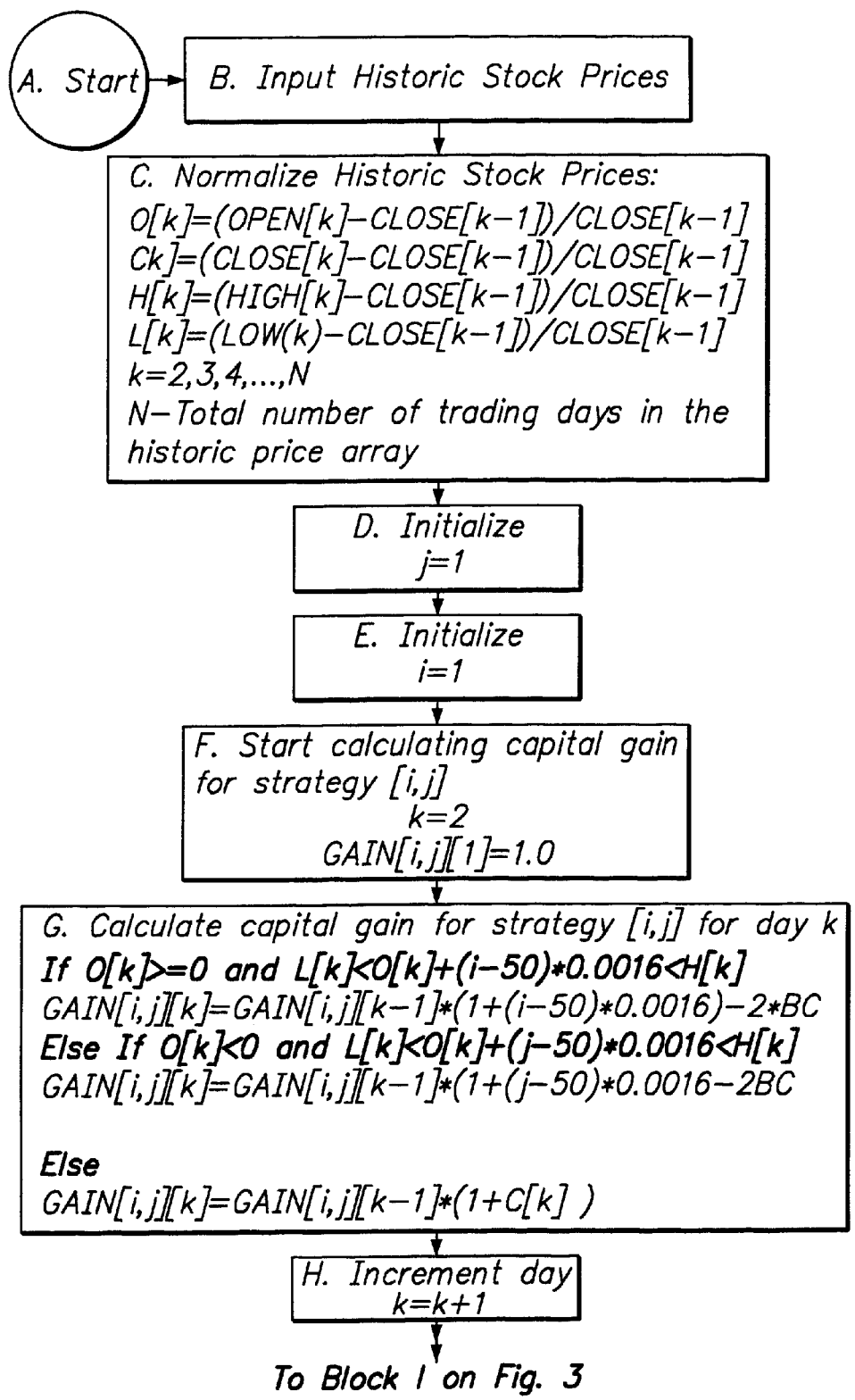
FIG. 2 shows the detailed step-by-step flow chart for calculating the strategy matrix. The first seven steps of the algorithm are shown. The flow chart includes all necessary formulas and equations to perform calculations for the first seven steps. It is continued on FIG. 3.

The system performs initialization—Blocks C on FIG. 2 by applying the following equations:

$$O[k]=(OPEN[k]-CLOSE[k-1])/CLOSE[k-1],$$

$$C[k]=(CLOSE[k]-CLOSE[k-1])/CLOSE[k-1],$$

$$H[k]=(HIGH[k]-CLOSE[k-1])/CLOSE[k-1],$$

$$L[k](LOW(k)-CLOSE[k-1])/CLOSE[k-1],$$

$$BC=(Broker\ Commission/Investment),$$

where k=2,3,4, . . . , N, and N is the total number of trading days in the historical price array.

OPEN[k]—historical opening stock price on day k,

CLOSE[k]—historical closing stock price on day k;

CLOSE[k−1]—historical closing stock price on day k−1,

HIGH[k]—historical highest stock price during day k,

LOW[k]—historical lowest stock price during day k,

SELL[k]—recommended sell price for trading day k,

O[k]—normalized opening stock price on day k,

C[k]—normalized closing stock price on day k,

H[k]—normalized high stock price on day k,

L[k]—normalized low stock price on day k,

BC—normalized broker commission per transaction,

GAIN[i,j][k]—normalized capital gain for strategy [i,j] and day k.

Sequence of values represent sequence of trading days: k=1 for first trading day, k=N for last trading day.

The system initializes indices i,j, and k—Blocks D through F on FIG. 2. The initial normalized capital gain is set to 1 as follows:

$$GAIN[i,j][1]=1.0.$$

The system proceeds with the calculation of the capital gain as a result of applying strategy [i,j] for day k—Block G on FIG. 2 and then advance index k—Block—H.

The system applies a by a day capital gain formula. The day capital gain formula consists of three conditions as follows.

Condition 1. If the opening price higher or equal to the closing price on the previous trading day and the value of O[k]+(i−50)×0.0016 is higher than L[k] and lower than H[k] for day k, then the capital gain for day k is calculated by the following equation:

$$GAIN[i,j][k]=GAIN[i,j][k-1]\times(1+(i-50)\times0.0016)-2\times BC.$$

Condition 2. If the opening price lower than the closing price on the previous trading day and the value of O[k]+(j−50)×0.0016 is higher than L[k] and lower than H[k] for day k, then the capital gain for day k is calculated by the following equation:

$$GAIN[i,j][k]=GAIN[i,j][k-1]\times(1+(j-50)\times0.0016)-2\times BC.$$

Condition 3. If neither of the above conditions is true, then the gain is calculated by the following formula:

$$GAIN[i,j][k]=GAIN[i,j][k-1]\times(1+C[k])$$

Figure 3:
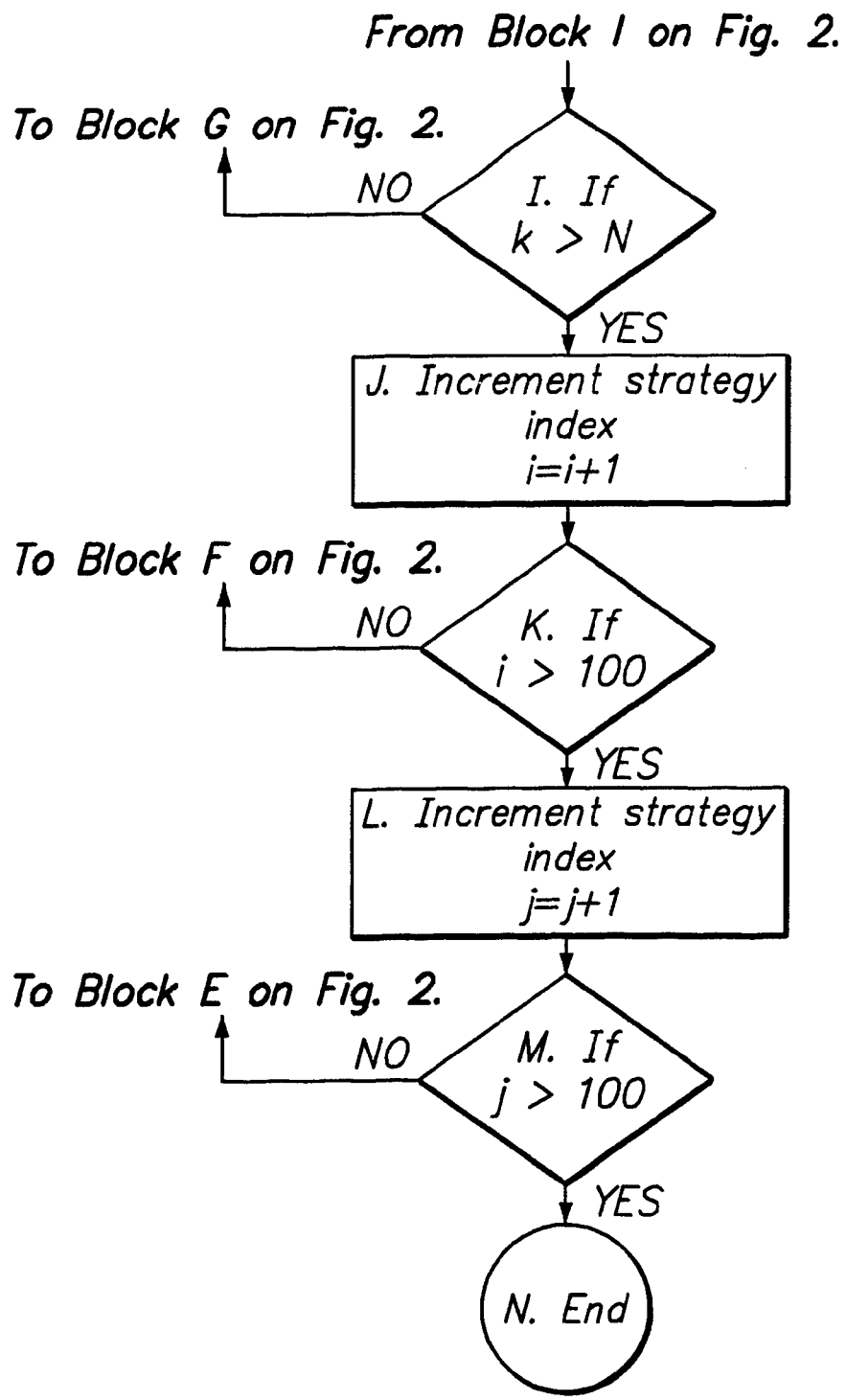
FIG. 3 is a continuation of the detailed step-by-step flow chart for calculating the strategy matrix. The flow chart includes all necessary formulas and equations to perform calculations for the remaining steps.

Then the system advances k to the next trading day Block H on FIG. 3.

When the calculation is completed for the strategy [i,j], the system sequentially advance indices i (Block J on FIG. 3), and j (Block L on FIG. 3).

Figure 4:
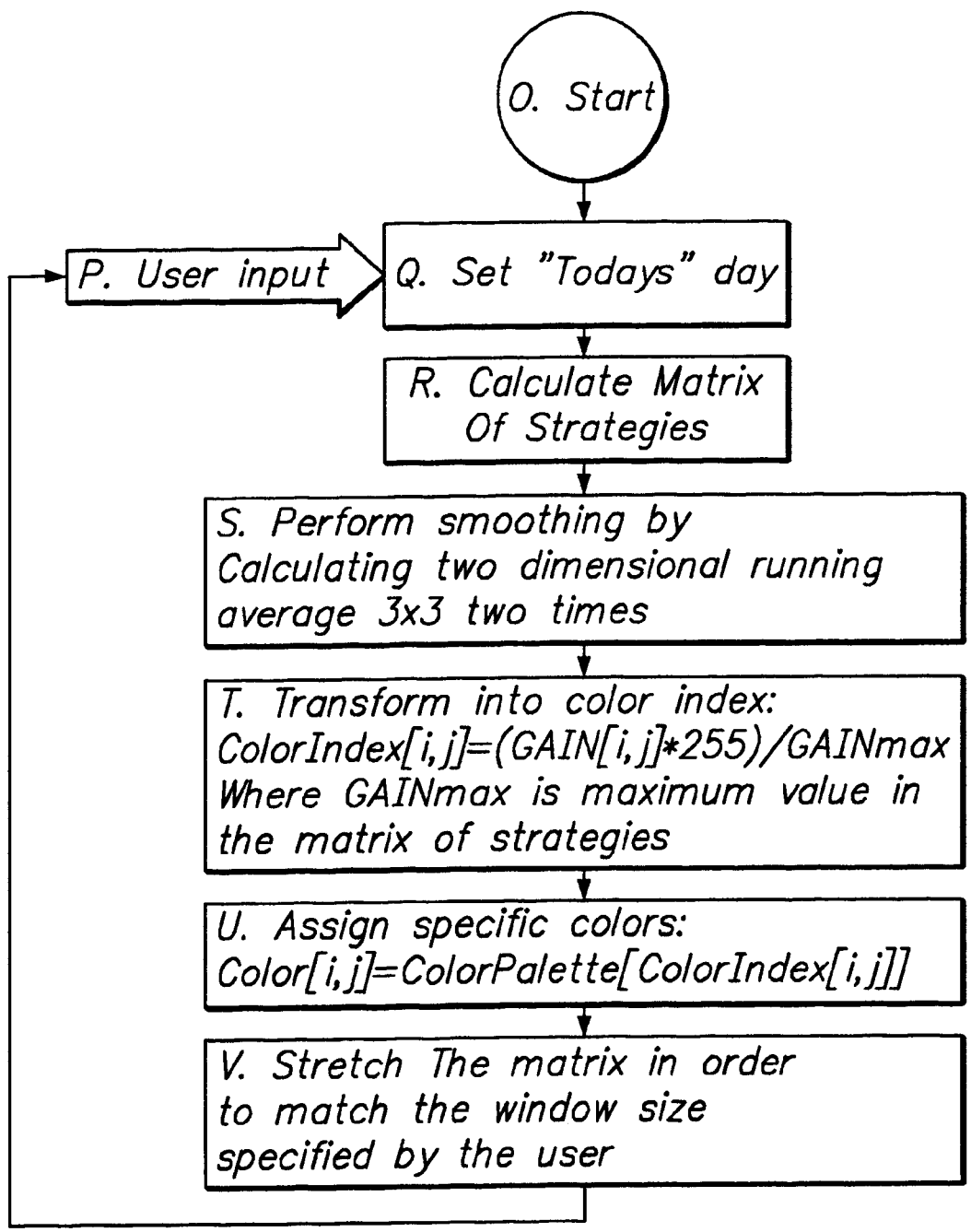
FIG. 4 shows the detailed step-by-step flow chart for visualizing the strategy matrix calculated by the flow chart on FIGS. 2 and 3. The flow chart includes all necessary formulas and equations to perform visualization of the strategy matrix.

When all of 10,000 strategies completed, the system visualizes the strategy matrix—Block O on FIG. 4. The system takes input for the date of analysis—Block P on FIG. 4, and then it calculates the strategy matrix applying said algorithm on FIG. 2 and FIG. 3. Then the system proceeds with the smoothing by calculating two-dimensional running average in the window 3 by 3—Block R on FIG. 4. Then the system assigns a color to each level of the capital gain—Block U on FIG.4.

The system then assign colors to each specific strategy from a palette of 256 different colors—Block U on FIG.4 by finding the maximum capital gain in the system and applying the following formula for transforming a strategy matrix into the color strategy matrix:

$$\text{ColorIndex}[i,j][k]=(\text{GAIN}[i,j][k]*255)/\text{GAINmax},$$

where GAINmax is the maximum value in the strategy matrix

Then the system stretches the color strategy matrix to match the display window size—Block V on FIG. 4. The user has ability to resize the window to get better resolution of small details.

Once the strategy matrix is displayed the user can return to Block P on FIG. 4, and change the viewing day date by moving the date slider to the left or right. The system automatically recalculates the strategy matrix for the entered date. Looking at the color map the user can immediately identify the best investment strategy or strategies for each day in the past. It is very easy to see if the selected best strategy or strategies are stable from date to date by moving the slider back and force. Of course, there is no guarantee that the same strategy would optimally work for all stocks and all periods of time, but the tool makes clear how fast the best strategy moves on the color map of capital gains, and gives the total capital gain since the beginning of investment, if the given strategy is followed.

Figure 5:
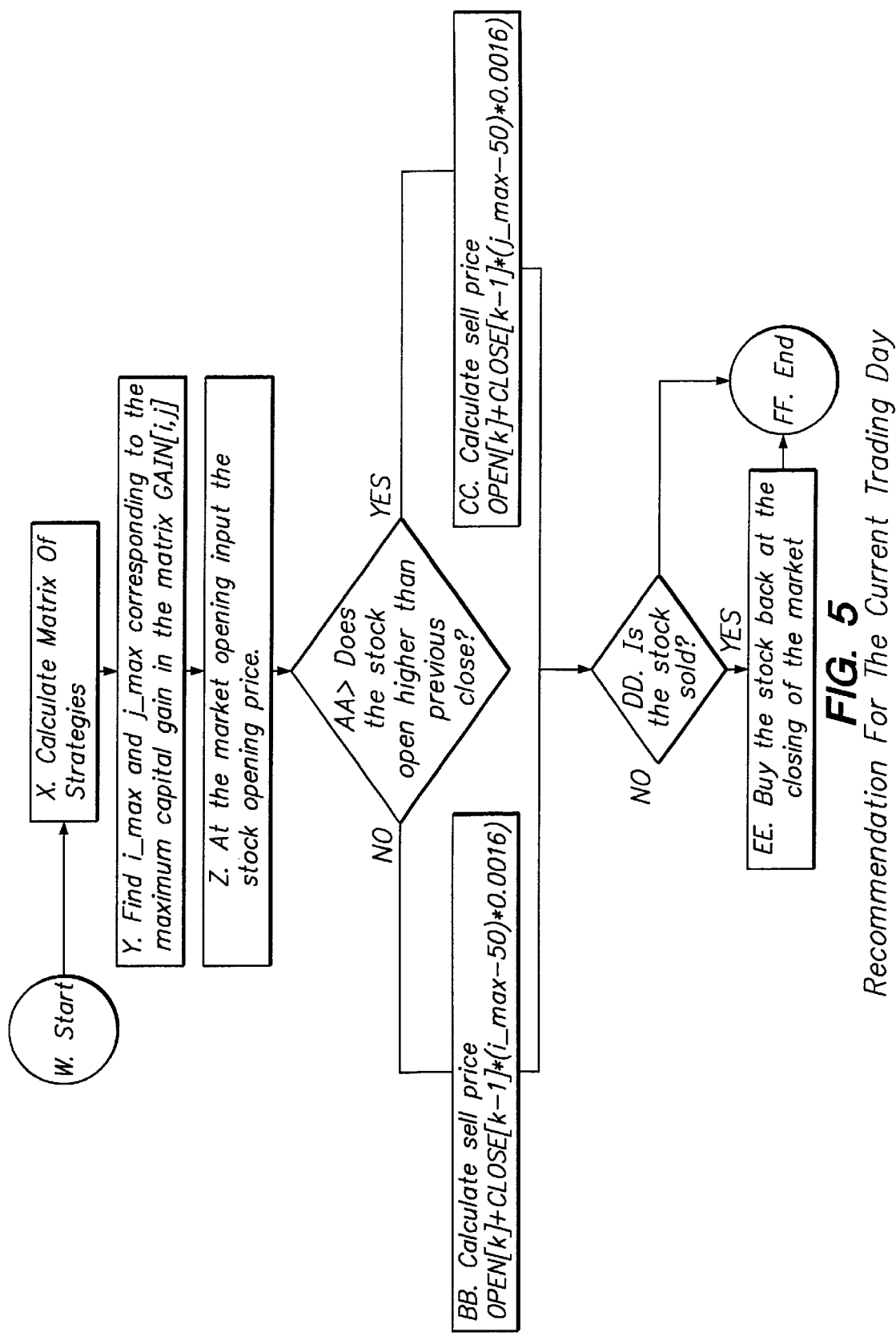
FIG. 5 shows the detailed step-by-step flowchart for calculating the recommended stock sell or sell limit order for the current trading day based on the strategy matrix. The flow chart includes all necessary formulas and equations to perform calculations of each day recommended stock order sell price.

Then the system calculates recommendation for the current trading day by applying the optimum strategy selected above—FIG. 5 The system finds i_max and j_max corresponding to the maximum capital gain in the strategy matrix GAIN[i,j]—Block Y on FIG. 5. Then it calculates the recommendation for the current trading day—Block AA through CC on FIG. 5:

The current trading day recommended price is calculated by using a formula for current day recommended order. If the opening price for the current trading day is higher or equal than the previous closing price, the recommended sell price is as follows $$\text{SELL}[k]=\text{OPEN}[k]+\text{CLOSE}[k-1]\times(i\_\text{max}-50)\times0.0016.$$

If the opening price for the current trading day is lower than the previous closing price, the recommended sell price is as follows $$\text{SELL}[k]=\text{OPEN}[k]+\text{CLOSE}[k-1]\times(j\_\text{max}-50)\times0.0016.$$

If the calculated recommended sell price is below the opening price then the recommendation is to place a sell stop limit order at this price. If the recommended sell price is above or equal to the opening price of the current trading day then the recommendation is to place a sell limit order at this price.

If the stock was sold during the trading day after placing the order, then the recommendation is to buy stock at market price just before the closing of the stock market—Block EE on FIG. 5. The same sequence of steps should be repeated for the next trading day.

What we claim as our invention is:

1. A method for optimizing capital gain of investments in stocks of publicly traded companies, comprising:
   (a) for a particular stock of a publicly traded company, normalizing open, high, low and close historical stock prices to the close price on the previous trading day,
   (b) repeating step (a) for a period of analysis,
   (c) forming a day capital gain multiplier for a first element among a plurality of elements of a strategy matrix using a day capital gain formula, wherein each element of the strategy matrix represents a trading strategy, wherein the strategy matrix is defined by a first axis associated with a rise in stock price and a second axis associated with a decline in stock price, and wherein the matrix comprises a set of such elements for each of a plurality of trading days,
   (d) forming a normalized total capital gain for the element of the strategy matrix by multiplying the day capital gain multiplier from step (c) for each trading day within the period of analysis,
   (e) repeating step (d) for all elements of the strategy matrix,
   (f) finding maximum normalized total capital gain in the strategy matrix, and
   (g) calculating a recommended stock sell order at the opening of a new trading day based on said formula for current day recommended order.

2. A method for fast visual evaluating dynamics and stability of strategy matrices versus time and selecting optimal strategies in a computer system, comprising:
   (a) allowing a user to enter a date of evaluation,
   (b) calculating a strategy matrix for the date of evaluation,
   (c) assigning a color to each element of the strategy matrix using a day capital gain formula for transforming the strategy matrix into a color strategy matrix,
   (d) repeating step (c) for each element of the strategy matrix to result in forming the color strategy matrix,
   (e) displaying the color strategy matrix in a display window on a computer monitor screen of the computer system,
   (f) repeating steps (a) through (e) for various consecutive dates at a rapid visualization speed making an animation effect (3 or more frames per second),
   (g) allowing visual evaluation of dynamics and stability of the strategy matrix where significant movements of similar color spots versus time represent instability of strategies,
   (h) receiving user input selecting optimal strategy where stable or growing same color spots color versus time represents area of optimal strategies.

3. A method of selecting stocks giving best capital gains when following said investment process, comprising:
   (a) selecting a period of analysis equal to three years;
   (b) defining the first year as a calculation period;
   (c) selecting a stock from a list of publicly traded companies having stock price history longer than the period of analysis selected in step (a),
   (d) calculating best strategy delivering maximum capital gain during the calculation period using said investment process, (e) calculating capital gain for the same stock and calculation period without any trade activity (buy and hold), (f) calculating ratio of the best capital gain (d) and a capital gain of a traditional investment strategy (e) for the same amount of initial investment value, (g) repeating steps (c) through (d) for various publicly traded companies and calculating list of ratio values for each stock, (h) selecting stocks from list (g) with ratio >2, (i) repeating steps (c) to (h) with second and third year as a calculation period and creating combined list of stocks, giving best capital gain.

4. A method as recited in claim 1, wherein the day capital gain formula is defined as:

if $O[k]>=0$ and $L[k]<O[k]+(i-50)*0.0016<H[k]$ then $GAIN[i,j][k]=GAIN[i,j][k-1]* (1+(I-50)*0.0016)-2*BC$;

else if $O[k]<0$ and $L[k]<O[k]+(j-50)*0.0016<H[k]$ then $GAIN[i,j][k]=GAIN[i,j][k-1]* (1+(I-50)*0.0016)-2*BC$;

else $GAIN[i,j][k]=GAIN[i,j][k-1]* (1+C[k])$;

where stored data values represent the following:

GAIN[i,j][k] is the strategy matrix, k represents a trading day, i, j represent coordinates of a strategy within the strategy matrix, O[k] represents a normalized historic opening stock price for day k, C[k] represents a normalized historic closing stock price for day k, H[k] represents a normalized historic high stock price for day k, and L[k] represents a normalized low stock price for day k.

5. A method as recited in claim 1, further comprising the step of generating a graphical color display of the strategy matrix, wherein each color of the display is associated with a different magnitude of capital gain, and wherein each element of the strategy matrix is represented in the display by a different pixel having a color corresponding to the day capital gain multiplier of a strategy that is associated with that element.

6. A method as recited in claim 1, further comprising the step of generating a graphical color display of the strategy matrix, wherein each color of the display is associated with a different magnitude of capital gain, wherein each color of the display may be rendered in one of a plurality of brightness levels corresponding to a relative magnitude of capital gain, and wherein each element of the strategy matrix is represented in the display by a different pixel having a color corresponding to the day capital gain multiplier of a strategy that is associated with that element and a brightness corresponding to a magnitude of the day capital gain multiplier for that element as compared with all other elements in the matrix.

7. A method as recited in claim 1, further comprising the steps of:

generating a graphical color display of the strategy matrix, wherein each color of the display is associated with a different magnitude of capital gain, and wherein each element of the strategy matrix is represented in the display by a different pixel having a color corresponding to the day capital gain multiplier of a strategy that is associated with that element;

receiving user input specifying a different trading day;

refreshing the display by rendering color pixels for all elements of the strategy matrix that are associated with the different trading day;

repeating the steps of receiving and refreshing rapidly to result in generating an animation that graphically displays changes in capital gain magnitude for the stock for the period of analysis.

8. A method as recited in claim 1, wherein the strategy matrix comprises a first axis representing a rise in stock price and a second axis representing a decline in stock price, and wherein each axis is sub-divided into a plurality of level values, wherein each of the level values represents a recommended selling price relative to an opening stock price on a current trading day.

9. A computer-readable medium carrying one or more sequences of instructions for optimizing capital gain of investments in stocks of publicly traded companies, which instructions, when executed by one or more processors, cause the one or more processors to carry out the steps of:

(a) for a particular stock of a publicly traded company, normalizing open, high, low and close historical stock prices to the close price on the previous trading day, (b) repeating step (a) for a period of analysis, (c) forming a day capital gain multiplier for a first element among a plurality of elements of a strategy matrix using a day capital gain formula, wherein each element of the strategy matrix represents a trading strategy, wherein the strategy matrix is defined by a first axis associated with a rise in stock price and a second axis associated with a decline in stock price, and wherein the matrix comprises a set of such elements for each of a plurality of trading days, (d) forming a normalized total capital gain for the element of the strategy matrix by multiplying the day capital gain multiplier from step (c) for each trading day within the period of analysis, (e) repeating step (d) for all elements of the strategy matrix, (f) finding maximum normalized total capital gain in the strategy matrix, and (g) calculating a recommended stock sell order at the opening of a new trading day based on said formula for current day recommended order.

10. A computer-readable medium as recited in claim 9, wherein the day capital gain formula is defined as:

if $O[k]>=0$ and $L[k]<O[k]+(i-50)*0.0016<H[k]$ then $GAIN[i,j][k]=GAIN[i,j][k-1]* (1+(I-50)*0.0016)-2*BC$;

else if $O[k]<0$ and $L[k]<O[k]+(j-50)*0.0016<H[k]$ then $GMN[i,j][k]=GAIN[i,j][k-1]* (1+(I-50)*0.0016)-2*BC$;

else $GAIN[i,j][k]=GAIN[i,j][k-1]* (1+C[k])$;

where stored data values represent the following:

GAIN[i,j][k] is the strategy matrix, k represents a trading day, i, j represent coordinates of a strategy within the strategy matrix, O[k] represents a normalized historic opening stock price for day k, C[k] represents a normalized historic closing stock price for day k, H[k] represents a normalized historic high stock price for day k, and L[k] represents a normalized low stock price for day k.

11. A computer-readable medium as recited in claim 9, further comprising the step of generating a graphical color display of the strategy matrix, wherein each color of the display is associated with a different magnitude of capital gain, and wherein each element of the strategy matrix is represented in the display by a different pixel having a color corresponding to the day capital gain multiplier of a strategy that is associated with that element.

12. A computer-readable medium as recited in claim 9, further comprising the step of generating a graphical color display of the strategy matrix, wherein each color of the display is associated with a different magnitude of capital gain, wherein each color of the display may be rendered in one of a plurality of brightness levels corresponding to a relative magnitude of capital gain, and wherein each element of the strategy matrix is represented in the display by a different pixel having a color corresponding to the day capital gain multiplier of a strategy that is associated with that element and a brightness corresponding to a magnitude of the day capital gain multiplier for that element as compared with all other elements in the matrix.

13. A computer-readable medium as recited in claim 9, further comprising additional sequences of instructions which, when executed by the one or more processors, cause the one or more processors to carry out the steps of:

generating a graphical color display of the strategy matrix, wherein each color of the display is associated with a different magnitude of capital gain, and wherein each element of the strategy matrix is represented in the display by a different pixel having a color corresponding to the day capital gain multiplier of a strategy that is associated with that element;

receiving user input specifying a different trading day;

refreshing the display by rendering color pixels for all elements of the strategy matrix that are associated with the different trading day;

repeating the steps of receiving and refreshing rapidly to result in generating an animation that graphically displays changes in capital gain magnitude for the stock for the period of analysis.

14. A computer-readable medium as recited in claim 9, wherein the strategy matrix comprises a first axis representing a rise in stock price and a second axis representing a decline in stock price, and wherein each axis is sub-divided into a plurality of level values, wherein each of the level values represents a recommended selling price relative to an opening stock price on a current trading day.

15. A method of generating a computer graphical display that enables fast visual evaluation of dynamics and stability of securities trading strategy matrices over a period of time and selecting one or more optimal securities trading strategies, the method comprising:

(a) creating and storing in computer memory, a strategy matrix for a specified date of evaluation;

(b) assigning a color to each element of the strategy matrix based on a transformation of the strategy matrix, resulting in creating and storing a color strategy matrix;

(c) displaying the color strategy matrix in a computer display as a plurality of color spots; and (d) repeating steps (a) through (c) for a plurality of consecutive evaluation dates at a speed sufficient to permit visual evaluation of dynamics and stability of the color strategy matrix, wherein significant graphical movement in the computer display of particular color spots over time represent instability of strategies.

16. A method as recited in claim 15, further comprising the step of (e) receiving user input that selects an optimal strategy from within an optimal strategy region of the display.

17. A method as recited in claim 15, further comprising the step of (e) receiving user input that selects an optimal strategy from within an optimal strategy region of the display, wherein the optimal strategy region comprises a plurality of color spots in the display that become similar in color over a period of time.

18. A method as recited in claim 15, wherein areas of the computer display having a similar color represent a similar level of accumulated capital gain.

19. A computer-readable medium carrying one or more sequences of instructions for generating a computer graphical display that enables fast visual evaluation of dynamics and stability of securities trading strategy matrices over a period of time and selecting one or more optimal securities trading strategies, which instructions, when executed by one or more processors, cause the one or more processors to carry out the steps of:

(a) creating and storing in computer memory, a strategy matrix for a specified date of evaluation;

(b) assigning a color to each element of the strategy matrix based on a transformation of the strategy matrix, resulting in creating and storing a color strategy matrix;

(c) displaying the color strategy matrix in a computer display as a plurality of color spots; and (d) repeating steps (a) through (c) for a plurality of consecutive evaluation dates at a speed sufficient to permit visual evaluation of dynamics and stability of the color strategy matrix, wherein significant graphical movement in the computer display of particular color spots over time represent instability of strategies.

20. A computer-readable medium as recited in claim 19, further comprising additional sequences of instructions which, when executed by the one or more processors, cause the one or more processors to carry out the step of (e) receiving user input that selects an optimal strategy from within an optimal strategy region of the display.

21. A computer-readable medium as recited in claim 19, further comprising additional sequences of instructions which, when executed by the one or more processors, cause the one or more processors to carry out the step of (e) receiving user input that selects an optimal strategy from within an optimal strategy region of the display, wherein the optimal strategy region comprises a plurality of color spots in the display that become similar in color over a period of time.

22. A computer-readable medium as recited in claim 19, wherein areas of the computer display having a similar color represent a similar level of accumulated capital gain.

23. A method as recited in claim 2, wherein the day capital gain formula is defined as:

if $O[k]>=0$ and $L[k]<O[k]+(i-50)*0.0016<H[k]$ then $GAIN[i,j][k]=GAMN[i,j][k-1] * (1+(I-50)*0.0016)-2*BC;$ else if $O[k]<0$ and $L[k]<O[k]+(j-50)*0.0016<H[k]$ then $GAIN[i,j][k]=GAIN[i,j][k-1] * (1+(I-50)*0.0016)-2*BC;$ else $GAIN[i,j][k]=GAIN[i,j][k-1] * (1+C[k]);$ where stored data values represent the following:
- GAIN[i,j][k] is the strategy matrix,
- k represents a trading day,
- i, j represent coordinates of a strategy within the strategy matrix,
- O[k] represents a normalized historic opening stock price for day k,
- C[k] represents a normalized historic closing stock price for day k,
- H[k] represents a normalized historic high stock price for day k, and
- L[k] represents a normalized low stock price for day k.

* * * * *

UNITED STATES PATENT AND TRADEMARK OFFICE
CERTIFICATE OF CORRECTION

PATENT NO.     : 6,493,681 B1
DATED          : December 10, 2002
INVENTOR(S)    : Leonid Tertitski et al.

It is certified that error appears in the above-identified patent and that said Letters Patent is hereby corrected as shown below:

<u>Column 11,</u>
Line 4, replace "GAMN" with -- GAIN --.

Signed and Sealed this

Ninth Day of September, 2003

JAMES E. ROGAN
*Director of the United States Patent and Trademark Office*